United States Patent
Law et al.

(10) Patent No.: US 6,937,686 B2
(45) Date of Patent: Aug. 30, 2005

(54) IRON CONTROL IN BWR'S WITH SACRIFICIAL ELECTRODES

(75) Inventors: Robert James Law, Livermore, CA (US); David Phillip Siegewarth, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/259,031

(22) Filed: Sep. 30, 2002

(65) Prior Publication Data

US 2004/0062339 A1 Apr. 1, 2004

(51) Int. Cl.[7] .............................................. G21C 19/28
(52) U.S. Cl. ....................... 376/306; 376/245; 376/305
(58) Field of Search ............................... 376/245, 305, 376/306; 324/700; 204/404, 411

(56) References Cited

U.S. PATENT DOCUMENTS

| | | | | |
|---|---|---|---|---|
| 3,891,528 A | * | 6/1975 | Griswold | 204/562 |
| 4,176,038 A | * | 11/1979 | Moeglich | 204/277 |
| 4,376,753 A | * | 3/1983 | Lucas | 376/305 |
| 4,564,499 A | * | 1/1986 | Honda et al. | 376/305 |
| 4,762,168 A | * | 8/1988 | Kawabe et al. | 165/11.1 |
| 4,789,448 A | * | 12/1988 | Woodhouse | 204/229.8 |
| 4,828,790 A | * | 5/1989 | Honda et al. | 376/306 |
| 4,948,492 A | * | 8/1990 | Niedrach et al. | 204/435 |
| 5,015,436 A | * | 5/1991 | Nagase et al. | 376/306 |
| 5,110,537 A | * | 5/1992 | Miura et al. | 376/305 |
| 5,122,330 A | * | 6/1992 | Solomon et al. | 376/245 |
| 5,151,244 A | * | 9/1992 | Law et al. | 376/245 |
| 5,188,715 A | * | 2/1993 | Chen et al. | 205/776 |
| 5,275,704 A | * | 1/1994 | Yang | 205/777 |
| 5,423,969 A | * | 6/1995 | Masumoto et al. | 204/196.1 |
| 5,465,278 A | * | 11/1995 | Cowan et al. | 376/245 |
| 5,519,330 A | * | 5/1996 | Yamauchi et al. | 324/700 |
| 5,531,865 A | * | 7/1996 | Cole | 205/751 |
| 5,571,394 A | * | 11/1996 | Hettiarachchi et al. | 204/400 |
| 5,609,740 A | * | 3/1997 | Hasegawa et al. | 204/400 |
| 5,746,904 A | * | 5/1998 | Lee | 205/757 |
| 5,876,575 A | * | 3/1999 | Kump | 204/248 |

FOREIGN PATENT DOCUMENTS

| | | | |
|---|---|---|---|
| JP | JE 0058480 | * | 12/1987 |
| JP | 63-135200 | * | 6/1988 |
| WO | WO 92/16673 | * | 10/1992 |
| WO | WO 99/28537 | * | 6/1999 |

OTHER PUBLICATIONS

Conductivity definitions hypertext—<http:/www.geocities.com>.*

* cited by examiner

Primary Examiner—Michael J. Carone
Assistant Examiner—John Richardson
(74) Attorney, Agent, or Firm—Nixon & Vanderhye

(57) ABSTRACT

Method for controlling the level of iron in feedwater of a BWR wherein an iron-containing sacrificial electrode in placed contact with the feed water dissolution of the electrode is induced at a rate which provides a desired level of iron in the feedwater.

11 Claims, 1 Drawing Sheet

IRON CONTROL IN BWR'S WITH SACRIFICIAL ELECTRODES

The present invention relates generally to feedwater chemical control in nuclear reactors. More specifically, the invention relates to the use of sacrificial electrodes/plates at corrosion rates controlled by electrical current or a reducing environment to control iron concentration in feedwater of nuclear boiling water reactors (BWR's).

BACKGROUND OF THE INVENTION

It is generally desirable to keep iron concentrations in BWR feedwater at a low level, typically within the range of 1 ppb±0.5 ppb Fe. In the past, this has been achieved with improvements in condensate clean up systems, and reduction of carbon steel corrosion in the condenser, feedwater piping and heat exchangers. Some plants have been very effective and now have lower than the optimum level of 1 ppb±0.5 ppb Fe. Total iron for a typical plant is approximately 100 Lbm (pounds mass per minute) Fe per year.

In the past, optimum levels of iron have been achieved by injecting iron in the feedwater stream. Direct injection of a solution, with soluble iron or iron particulates, has been proposed. However, these methods generally require an active pumping approach, and have been rejected for use with BWR's due to their complexity and lack of reliability.

Another approach has been to employ a passive pellet dissolution system recirculating hot water around the final feedwater pump. This also has not met with acceptance.

A further proposal has been to incorporate iron in the zinc system as iron pellets or compounds of zinc-iron. The potential problem with this approach is that the zinc system only allows one or the other to be controlled. For acceptable control, plants should be able to exercise independent control of both compounds.

Some plants have used condensate clean-up system bypass flow to elevate the feedwater iron. However, this is not an acceptable approach as it allows undesirable chemicals to bypass the condensate clean-up system.

BRIEF DESCRIPTION OF THE INVENTION

It has now been discovered, according to the present invention, that it is possible to control the level of feedwater iron in BWR's by controlling the rate of dissolution from a sacrificial electrode, for example by way of electrical current or by a reducing environment. An advantage of the present invention is that it utilizes relatively simple system and control techniques, and thereby minimizes concerns associated with the use of externally operated solution injection systems with their attendant containers, solutions pumps and seals.

In one aspect, the present invention provides a method of controlling the level of iron in feedwater of a BWR comprising the step of bringing the feedwater into contact with an iron-containing sacrificial electrode and inducing dissolution of the electrode at a rate which provides a desired level of iron in the feedwater. The corrosion rate is controlled by an electric current or by a reducing environment.

BRIEF DESCRIPTION OF THE DRAWINGS

The invention is now described in more detail with reference to the accompanying Figures, in which.

DETAILED DESCRIPTION OF THE INVENTION

Figure 1:
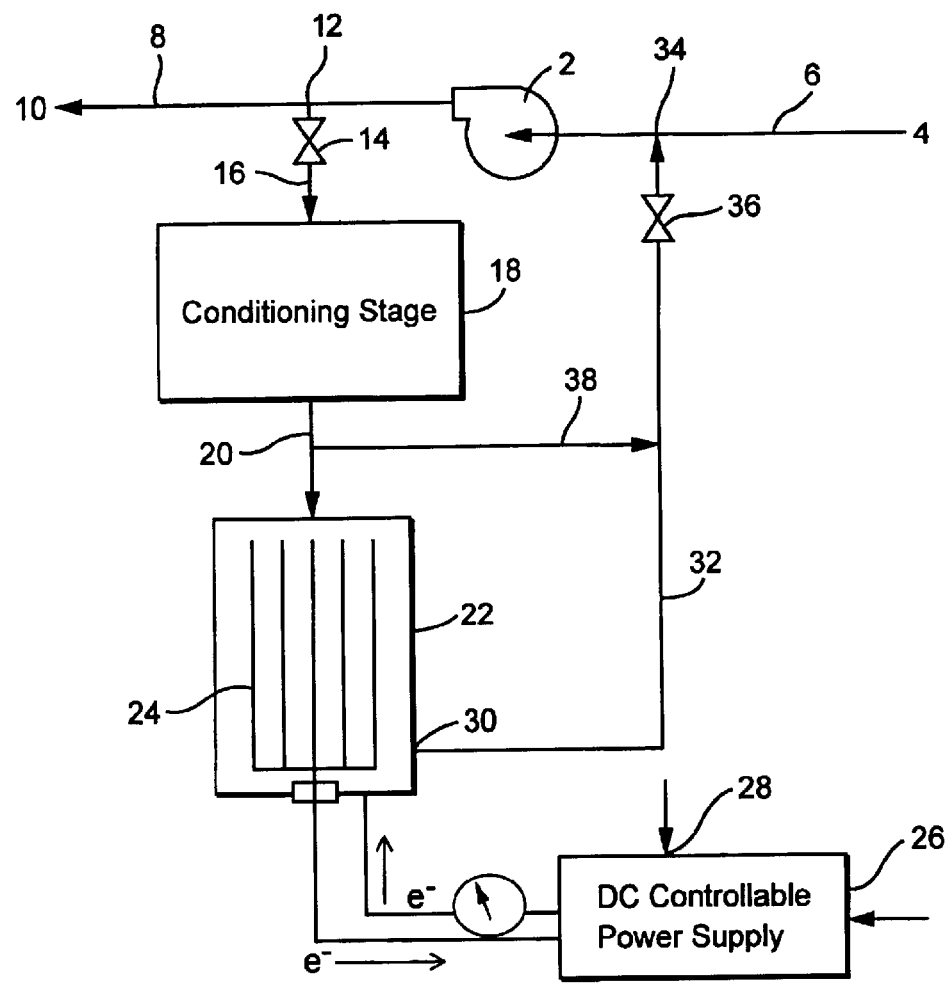
FIG. 1 is a schematic representation of a system for carrying out the method of the invention.

Referring to FIG. 1, there is shown a schematic representation of a system for carrying out the method of the invention. The system includes a feedwater pump 2 which pumps feedwater from a condenser 4 along lines 6 and 8 to a vessel 10. For discussion purposes hereinafter, reference will be made to a BWR (boiling water reactor) as the vessel. However, it will be understood that the invention of the present application may be utilized in other systems requiring the introduction of iron into the water, including, but not limited to, pressure water reactors (PWR's).

Feedwater is drawn off from line 8 at point 12 through valve 14 along line 16 to conditioning stage 18. The amount of water drawn off (measured in gallons per minute) depends on efficiency, surface area of electrodes, current, conductivity, dissolved oxygen, solubility, etc., which is computed according to methods known in the art. Zinc skid flow rates of 20 to 100 gpm may be used. The conductivity is adjusted in 18 by chemical addition or just what ever zinc skid output is. The conductivity between electrode plates must be sufficient to pass sufficient current to corrode the plates and supply enough soluble iron ions. Spacing and conductivity are important. The zinc injection solution may have sufficient conductivity or it may be necessary to add chemicals to have sufficient conductivity. For this latter approach, it is necessary to make the system small such that the over all input does not impact feedwater quality.

Conditioned water from the conditioning stage 18 having a conductivity of 0.056 to <1 uS/cm. is fed through line 20 to an electrode container 22 provided with iron-containing sacrificial electrodes 24. The electrodes are in close proximity and may be of any design, such as plates, wires, tubes, etc. The container 22 serves as the opposing electrode to the sacrificial electrodes 24, or could be alternate electrode plates. The electrode arrangement is powered by a DC controllable power supply 26 which supplies the necessary voltage to overcome reduction potential and over-voltage to develop reaction currents. Power to the electrode arrangement is controlled remotely at 28 so as to control the rate of dissolution of the iron-containing electrodes and thus the concentration of iron introduced into the feedwater. Water containing additional iron exits the electrode container at 30 and is fed along line 32 to entry point 34 via valve 36 upstream of the feedwater pump 2. A pressure break-down device is provided in stream 38, such as a valve or orifice, to create a driving pressure through 22. A bypass line 38 is provided between line 20 and line 32 to permit recirculation of water from conditioning stage 18 without undergoing treatment in the electrode container 22. In this way, conditioned water without added iron is mixed with water containing added iron exiting the electrode container at 30, to control the concentration of iron in the water as it is reintroduced into line 6 at entry point 34. There may be no need for line 38 if the conditioning 18 is only for the electrode container 22.

Conditioned water from the conditioning stage 18 having a conductivity of 0.056 to <1 siemens/cm. is fed through line 20 to an electrode container 22 provided with iron-containing sacrificial electrodes 24. The electrodes are in close proximity and may be of any design, such as plates, wires, tubes, etc. The container 22 serves as the opposing electrode to the sacrificial electrodes 24, or could be alternate electrode plates. The electrode arrangement is powered by a DC controllable power supply 26 which supplies the necessary voltage to overcome reduction potential and overvoltage to develop reaction currents. Power to the electrode arrangement is controlled remotely at 28 so as to control the rate of dissolution of the iron-containing electrodes and thus the concentration of iron introduced into the feedwater. Water containing additional iron exits the electrode container at 30 and is fed along line 32 to entry point 34 via valve 36 upstream of the feedwater pump 2. A pressure break-down device is provided in stream 38, such as a valve or orifice, to create a driving pressure through 22. A bypass line 38 is provided between line 20 and line 32 to permit recirculation of water from conditioning stage 18 without undergoing treatment in the electrode container 22. In this way, conditioned water without added iron is mixed with water containing added iron exiting the electrode container at 30, to control the concentration of iron in the water as it is reintroduced into line 6 at entry point 34. There may be no need for line 38 if the conditioning 18 is only for the electrode container 22.

The low conductivity of feedwater may make it difficult to run the electrode container with only feedwater. To counter this, solid electrolytic membranes may be used, such as those used for example in hydrogen generators, wherein the membrane is attached to the container and the sacrificial electrode is attached to the opposite site in contact with the feedwater (either direct or side stream feedwater). Alternatively, low conductivity may be overcome using narrow electrode gaps. Utilization of porous sacrificial electrodes may be of assistance in this regard. The solid electrolytic membrane allows ionic transfer across without liquid chemicals such as sodium hydroxide, etc. These are used in hydrogen/oxygen generators with only demineralized water on either side.

Figure 2:
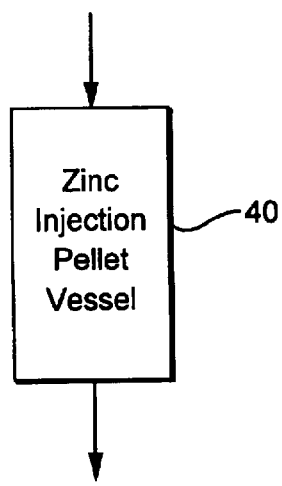
FIG. 2 is a first alternate conditioning stage.

FIG. 2 shows a first alternate conditioning stage 40, which replaces stage 18 in FIG. 1, and utilizes zinc injection pellets. A zinc skids is a bed of zinc oxide pellets that dissolve at rates determined by temperature and flow rate. The three enhancements for dissolution of the electrodes are increasing conductivity with chemicals, utilizing current injection chemicals such as zinc and lowering the oxygen concentration to enhance corrosion. One, two or all three may be used to yield the desired iron rate of injection. Water of low conductivity, typically 0.06 to 0.1 siemens/cm, enters the upstream side of the stage and exits with a higher conductivity, typically >1 siemens/cm, into the electrode container 22.

Figure 3:
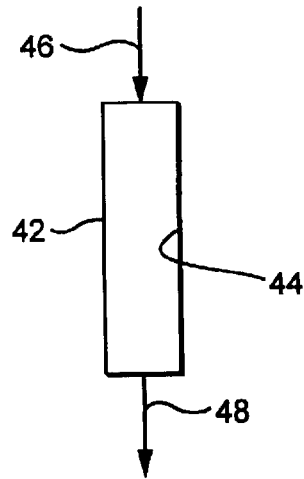
FIG. 3 is a second alternate conditioning stage.

FIG. 3 shows a second alternate conditioning stage 42 comprising a catalyst surface 44 of high surface area with noble metals such as Pt, Pd, Rh, etc. Hydrogen injection would also be necessary to increase the molar ratio of hydrogen to oxygen >2. which recombines oxygen and excess hydrogen thereby creating an iron reducing environment. In this arrangement, the incoming stream 46 contains excess hydrogen normally obtained during HWC (Hydrogen Water Chemistry) operations, and the output 48 contains very low to zero oxygen concentration. It may be necessary to use zinc or chemical injection to raise conductivity in conjunction with very low oxygen benefits.

A further approach would be to create a reducing/corrosion environment (near zero oxygen) in a side stream and control the iron injection with flow control and/or electrical potential adjustments. Reducing oxygen to below 2 to 5 ppb increases iron corrosion and produce the soluble ionic chemical form. This may be achieved with HWC and a catalytic upstream surface. This low oxygen concentration has been observed in BWR sample lines after Noblechem applications. Utilization of a porous sacrificial electrode improves dissolution. This will be passive during the time the plant is injecting hydrogen for HWC or the use noble metals for mitigating corrosion and tracking.

A further approach would be to inject hydrogen into the supply line upstream of a catalytic recombiner device to the passive iron-surface/container. Porous pellets may be used independently of the zinc container but potentially on the same skid.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Method for controlling the level of iron in feedwater of a BWR or PWR comprising providing a iron-containing sacrificial electrode in contact with the feed water of said BWR or PWR and inducing dissolution of the electrode at a rate which provides a level of iron in said feedwater, wherein feedwater is introduced into a conditioning stage upstream of the said electrode to provide a conductivity level of 0.056 to <1 siemens/cm.

2. Method according to claim 1, wherein the level of iron is 1 ppb±0.5 ppb.

3. Method according to claim 1, wherein said iron-containing sacrificial electrode is housed in an electrode container.

4. A method according to claim 3, wherein said electrode is controlled by a DC controllable power supply.

5. A method according to claim 1, wherein said feedwater is circulated through said conditioning stage and an electrode container and back to said BWR or PWR.

6. A method according to claim 1, wherein said feedwater is circulated through said conditioning stage and an electrode container and back to said BWR or PWR.

7. Method for increasing the level of iron in feedwater of a BWR or PWR comprising providing a iron-containing sacrificial electrode in contact with the feed water of said BWR or PWR and inducing dissolution of the electrode at a rate which provides a level of iron in the feedwater, wherein feedwater is introduced into a conditioning stage upstream of the said electrode to provide a conductivity level of 0.056 to <1 siemens/cm.

8. Method according to claim 7, wherein the level of iron is 1 ppb±0.5 ppb.

9. Method according to claim 7, wherein said iron-containing sacrificial electrode is housed in an electrode container.

10. A method according to claim 9, wherein said electrode is controlled by a DC controllable power supply.

11. Method for increasing the level of iron in feedwater of a BWR or PWR comprising providing a iron-containing sacrificial electrode in contact with the feed water of said BWR or PWR and inducing dissolution of the electrode at a rate which provides a level of iron in the feedwater, wherein said feedwater is circulated through a conditioning stage and an electrode container and back to said BWR or PWR.

* * * * *

UNITED STATES PATENT AND TRADEMARK OFFICE
CERTIFICATE OF CORRECTION

PATENT NO. : 6,937,686 B2 Page 1 of 1
DATED : August 30, 2005
INVENTOR(S) : Law et al.

It is certified that error appears in the above-identified patent and that said Letters Patent is hereby corrected as shown below:

Column 3,
Line 38, the word "skids" should read as -- skid --.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,937,686 B2
DATED : August 30, 2005
INVENTOR(S) : Law et al.

It is certified that error appears in the above-identified patent and that said Letters Patent is hereby corrected as shown below:

<u>Title page,</u>
Item [75], Inventors, delete "David Phillip Siegewarth" and insert
-- David Phillip Siegwarth --.

Signed and Sealed this

Twenty-first Day of March, 2006

JON W. DUDAS
*Director of the United States Patent and Trademark Office*